United States Patent [19]

Lakatos et al.

[11] 4,133,866

[45] Jan. 9, 1979

[54] PROCESS FOR THE SELECTIVE SEPARATION OF THE BOUND SODIUM CONTENT OF RED MUD

[75] Inventors: Tamás Lakatos; Mihály Miskei; János Szolnoki, all of Budapest; Ferenc Tóth; László Révész, both of Almásfuzito, all of Hungary

[73] Assignees: Aluminiumipari Tervezo es Kutato Intezet; Almasfuzitoi Timfoldgyar; MTA Geokemiai Kutatolaboratorium, all of Hungary

[21] Appl. No.: 846,588

[22] Filed: Oct. 28, 1977

[30] Foreign Application Priority Data

Oct. 29, 1976 [HU] Hungary .............................. AU 364

[51] Int. Cl.² ............................................. C22B 26/10
[52] U.S. Cl. .................................... 423/208; 423/131; 423/132
[58] Field of Search ....................... 423/208, 131, 132; 75/104

[56] References Cited

U.S. PATENT DOCUMENTS

| | | | |
|---|---|---|---|
| 3,574,537 | 4/1971 | Tsai | 423/208 |
| 3,985,567 | 10/1976 | Iwu | 423/132 |
| 4,045,537 | 8/1977 | Hrishikesan | 423/131 |

FOREIGN PATENT DOCUMENTS 1592104  3/1972  Fed. Rep. of Germany .......... 423/132

*Primary Examiner*—G. O. Peters
*Assistant Examiner*—Wayne A. Langel
*Attorney, Agent, or Firm*—Young & Thompson

[57] ABSTRACT

The invention relates to a novel process for the selective recovery of the sodium content of red mud originating from alumina plants. According to the process of the invention red mud or a slurry thereof is admixed with a ferric sulfate solution, the resulting suspension is stirred intensively for 0.5 to 1 hour at 15 to 85° C, thereafter, if necessary, the pH of the suspension is adjusted to 4.4 to 4.6 and the solid substance is removed from the suspension.

Using the process of the invention the sodium oxide content of red mud can be reduced to below 1.5%.

7 Claims, No Drawings

PROCESS FOR THE SELECTIVE SEPARATION OF THE BOUND SODIUM CONTENT OF RED MUD

This invention relates to a novel process for the selective separation of the bound sodium content of red mud originating from alumina plants.

Red mud is an industrial by-product which forms in large amounts during the alumina production according to the Bayer process. Red mud contains, besides a large quantity of iron, a considerable amount of bound sodium as well.

The economical plant-scale utilization of red mud has not been solved so far. The problems can be attributed primarily to the great humidity and high sodium oxide content (6 to 15%) of red mud.

As sodium oxide is a valuable reactant widely utilized in the chemical industry, its recovery from red mud would be very desirable. One of the most serious problems of alumina production is that there is a loss of sodium oxide of 180 to #kg per 1 ton of alumina.

Sodium oxide also impedes the metallurgical utilization of red mud by disturbing the smelting procedure. The disturbing effect appears primarily in the rapid deterioration of the walls of the furnace utilized in iron recovery.

According to the known techniques, pyrometallurgical methods are applied for the recovery of sodium oxide from red mud, or red mud is caustified with lime. These known methods are described in the following references: Neue Hütte 20 (3), 145–148 (1975); Industrie Minérale 57 (8–9), 427 (1975 IX), Vestnik Akademii Nauk Kaz. SSR 1, 30–33 (1975) and Engineering and Mining Journal 136–138 (1971; September).

A disadvantage of pyrometallurgical methods is their expensive nature arising from the necessity of removing the large humidity content of the starting substance. Furthermore, these methods cannot be applied in the economical processing of red muds with relatively high sodium contents.

The methods using lime as caustifying agent are able to remove only a part of the sodium content of red mud which, having been processed in this way, still contains about 3 to 7% of sodium oxide.

The invention aims at the elaboration of an effective and economical method for the plant-scale separation of the bound sodium content of red mud.

It has been found that the sodium content of red mud can be decreased to about 0.1 to 1.5% (expressed as sodium oxide) when subjecting red mud or a slurry thereof to hydrometallurgical treatment. This remaining sodium content does not disturb the smelting procedure.

In accordance with the invention one proceeds as follows. Red mud or a slurry thereof is admixed with ferric sulfate solution, the resulting suspension is stirred intensively at 15° to 85° C. for 0.5 to 1 hour, then, if necessary, the pH of the resulting slurry, which contains an aqueous solution of sodium sulfate, is adjusted to 4.4 to 4.6, and the solid substance is separated.

The ferric sulfate solution applied to leach red mud may contain preferably 1 to 35 g/l, particularly 15 to 25 g/l of iron, and may have a pH value of preferably 0 to 2.4, particularly 2.2. Ferric sulfate solutions of any origin can be applied in the process of the invention. Ferric sulfate solutions obtained by the microbiological oxidation of ferrous sulfate solutions proved to be, however, particularly preferable. Solutions of the latter type can be prepared e.g. from a pickling solution containing sulfuric acid and 1 to 35 g/l of iron or from a solution of crystalline ferrous sulfate ($FeSO_4 \cdot 7H_2O$), by adjusting the pH of the solution to 1.8 to 2.4, inoculating the solution with a culture of *Thiobacillus ferrooxidans* and performing bacterium-catalyzed oxidation. The reason for the superiority of ferric sulfate solutions prepared by microbiological oxidation over other solutions is not yet known. It can be assumed, however, that the presence of microorganisms has a favourable influence on the chemical process involved in the leaching step.

The amount of ferric sulfate solution used in the leaching step depends on its ferric sulfate concentration and on the sodium content of the red mud to be treated. Ferric sulfate solutions containing 0.8 to 1.5-fold of the stoichiometric amount of iron and 0.02 to 0.5 fold of the stoichiometric amount of sulfuric acid calculated for the sodium oxide content of red mud proved to be preferable.

The main advantages of the process according to the invention are as follows:

1. Red mud of high sodium content, which forms during the alumina production and is unsuitable for smelting in its original state, can be converted into an easily smeltable substance, since its sodium oxide content can be reduced to below 1.5%.
2. The degree of sodium recovery is equal to or even higher than 90%, and the process is fast.
3. The new process of the invention enables the elimination of red mud dumps which would otherwise cause serious problems of storage and environmental pollution.
4. The new process provides a solution of sodium sulfate content which can be used directly in the supplemental bauxite leaching technology.
5. The iron content of the leaching solution is transferred completely to the red mud, thereby improving its quality and making it more appropriate for metallurgical purposes.

The invention is elucidated in detail by the aid of the following non-limiting Examples.

EXAMPLE 1

Red mud with a composition (calculated as dry substance)

| | | |
|---|---|---|
| $Fe_2O_3$ | = | 39.2% |
| $Al_2O_3$ | = | 16.8% |
| $SiO_2$ | = | 14.5% |
| $Na_2O$ | = | 9.6% |
| $TiO_2$ | = | 5.3% |
| losses on ignition | = | 6.6% |
| CaO | = | 1.8% |
| MgO | = | 1.0% |
| other | =5.2% | | and a ferric sulfate solution are admixed with each other in a continuous manner at a rate ensuring a steady solid/liquid ratio of 1:6.2. The ferric sulfate solution, produced by the bacterium-catalyzed oxidation of a ferrous sulfate solution, has the following characteristics:

| | | |
|---|---|---|
| $Fe_{total}$ | = | 15.5% |
| $Fe^{3+}$ | = | 15.4% |
| pH | = | 2.08 |
| redox potential | = | 605 mV |

The slurry is stirred intensively at room temperature for 1 hour, thereafter it is filtered and the filter cake is washed with water. The pH of the filtrate is 4.62. The dried filter cake has the following composition (calculated for dry substance):

| | | |
|---|---|---|
| $Fe_2O_3$ | = | 46.9% |
| $Al_2O_3$ | = | 15.2% |
| $SiO_2$ | = | 12.9% |
| $Na_2O$ | = | 0.7% |
| $TiO_2$ | = | 4.2% |
| losses on ignition | = | 14.9% |
| CaO | = | 1.4% |
| MgO | = | 0.8% |
| other | = | 3.0% |

EXAMPLE 2

10.3 l of 10 N sulfuric acid and then 1.04 m³ of ferric sulfate solution are added to 1.0 m³ of stirred red mud slurry originating from alumina production. The temperature of the slurry is 75° C. The slurry is then stirred for 0.5 to 1 hours.

The starting slurry contains 181 g/l of red mud. The composition of solid red mud (dried at 130° C.) is as follows:

| | | |
|---|---|---|
| $Fe_2O_3$ | = | 39.2% |
| $Al_2O_3$ | = | 16.8% |
| $SiO_2$ | = | 14.5% |
| $TiO_2$ | = | 5.3% |
| CaO | = | 1.8% |
| MgO | = | 1.0% |
| $Na_2O$ | = | 9.6% |
| losses on ignition | = | 6.6% |
| other | = | 5.2% |

The composition of the aluminate liquor is as follows:

| | | |
|---|---|---|
| $Al_2O_3$ | = | 3 g/l |
| $SiO_2$ | = | 0.01 g/l |
| $Na_2O_{caustic}$ | = | 4.12 g/l |
| $Na_2O_{total}$ | = | 5.74 g/l |

The ferric sulfate solution is produced by the bacterium-catalyzed oxidation of a ferrous sulfate solution.

After leaching, the slurry is filtered and the filter cake is dried. The composition of the dry filter cake is as follows:

| | | |
|---|---|---|
| $Fe_2O_3$ | = | 46.5% |
| $Al_2O_3$ | = | 16.3% |
| $SiO_2$ | = | 12.8% |
| $Na_2O$ | = | 0.3% |
| losses on ignition | = | 15.3% |
| $TiO_2$ | = | 5.0% |
| CaO | = | 1.7% |
| MgO | = | 0.9% |
| other | = | 1.2% |

The resulting filter cake can be briquetted or pelleted for metallurgical processing.

What is claimed is:

1. A process for the selective recovery of the sodium content of red mud from alumina production according to the Bayer process, characterized in that said red mud or a slurry thereof is admixed with a ferric sulfate solution, the resulting suspension is stirred intensively for 0.5 to 1 hour at 15° to 85° C., and thereafter solid substance is removed from the suspension at a pH of 4.4 to 4.6.

2. A process as claimed in claim 1, characterized in that the red mud or the slurry thereof is admixed with a ferric sulfate solution prepared from a pickling solution containing sulfuric acid, said ferric sulfate solution containing 0.8 to 1.5-fold of the stoichiometric amount of iron and 0.02 to 0.5-fold of the stoichiometric amount of sulfuric acid calculated for the sodium oxide content of said red mud.

3. A process as claimed in claim 1, characterized in that the red mud or a slurry thereof is admixed with a ferric sulfate solution obtained by the microbiological oxidation of a ferrous sulfate solution.

4. A process as claimed in claim 3, characterized in that the red mud or a slurry thereof is admixed with a ferric sulfate solution obtained by the oxidation of a ferrous sulfate solution catalyzed with Thiobacillus ferrooxidans.

5. A process as claimed in claim 1, characterized in that the red mud or the slurry thereof is admixed with a ferric sulfate solution containing 1 to 35 g/l of iron and having a pH of 0 to 2.4.

6. A process as claimed in claim 5, in which said ferric sulfate solution contains 15 to 25 g/l of iron.

7. A process as claimed in claim 5, in which said pH of said ferric sulfate solution is about 2.2.

* * * * *